United States Patent [19]

Hergenrother et al.

[11] Patent Number: 5,244,966
[45] Date of Patent: Sep. 14, 1993

[54] 1,3,2-DIOXASTANNOLANE-MODIFIED ELASTOMERS AND COMPOSITIONS CONTAINING THEM HAVING REDUCED HYSTERESIS PROPERTIES

[75] Inventors: William L. Hergenrother; James Oziomek, both of Akron, Ohio

[73] Assignee: Bridgestone Corporation, Tokyo, Japan

[21] Appl. No.: 814,550

[22] Filed: Dec. 30, 1991

[51] Int. Cl.$^5$ ............................................. C08F 8/42
[52] U.S. Cl. ................................ 524/572; 525/332.8; 525/332.9; 525/333.1; 525/333.2; 525/370
[58] Field of Search .......................... 525/370; 524/572

[56] References Cited

U.S. PATENT DOCUMENTS

| | | | |
|---|---|---|---|
| 3,426,006 | 2/1969 | Nützel et al. | 260/83.5 |
| 3,439,049 | 4/1969 | Trepka | 260/624 |
| 4,414,372 | 11/1983 | Farnham et al. | 526/190 |
| 4,429,091 | 1/1984 | Hall | 526/181 |
| 4,614,771 | 9/1986 | Watanabe et al. | 525/351 |
| 4,616,069 | 10/1986 | Watanabe et al. | 525/370 |
| 4,736,003 | 4/1988 | Schneider et al. | 526/190 |

FOREIGN PATENT DOCUMENTS

| | | |
|---|---|---|
| 0282437 | 9/1988 | European Pat. Off. . |
| 0290883 | 11/1988 | European Pat. Off. . |
| 0316255 | 5/1989 | European Pat. Off. . |
| 247455 | 7/1987 | German Democratic Rep. . |
| 2117778 | 10/1983 | United Kingdom . |

OTHER PUBLICATIONS

"the Organic Chemistry of Tin", Interscience Publishers, 1971, by Wilhelm P. Neumann.
"Preparation of Some Trialkyltin-lithium Compounds", J. Am. Chem. Soc., 75, 2507-2508 (1953) by Gillman and Rosenberg.
"Preparation and Reactions of Trialkyltin-lithium", J. Org. Chem, 28, 237-239 (1963), by Tamborski, Ford and Soloski.
"Some Reactions of Tributyl-and Triphenyl-stannyl Derivatives of Alkali Metals", J. Chem. Soc., 1961, 618-622 by Blake, Coates and Tate.
"New Perfectly Difunctional Organolithium Initiators for Block Copolymers Synthesis: Synthesis of dilithium initiators in the absence of polar additives" Polymer, vol. 22, Dec. 1981, p. 1724, by Guyot, et al.
"A Bifunctional Anionic Initiator Soluble in Nonp14 Polar Solvents", Makromol. Chem. 179, 1978, pp. 551-555, by Beinert, et al.
"Bifunctional Anionic Initiators: A Critical Study and Overview", Makromol. Chem. 1986, 1985, pp. 2017-2024, by Bandermann, et al.
"Anionic Polymerization Initiators Containing Protected Functional Groups and Functionally Terminated Diene Polymers", Journal of Polymer Science, Polymer Chemistry Edition, vol. 12, pp. 153-166, by Schulz (1974).
"Specific Functionalization of Polymers by Carboxyl Groups", Makromol. Chem. 179, 1978, pp. 1383-1386, by Broze, et al.
"3-Dimethylaminopropyl-Lithium—An analytical and Kinetic Investigation of a New Initiator System for Polymer Synthesis", European Polymer Journal, vol. 11, 1975, pp. 699-704, by Eisenbach, et al.
"Organotin-Mediated Monoacylation of Diols with Reserved Chemoselectivity: A Convenient Synthetic Method", J. Org. Chem., 55, 5132-5139 (1990) by G. Reginato, et al.

*Primary Examiner*—Bernard Lipman
*Attorney, Agent, or Firm*—Daniel N. Hall

[57] ABSTRACT

Modification of lithium-terminated elastomer intermediates by reaction under anionic conditions with 1,3,2-dioxastannolanes provides tin-containing elastomers with improved hysteresis properties. In specific examples, modification of a lithium-terminated styrene-butadiene rubber with a dioxastannolane derived from reaction of dibutyl tin(IV)oxide with an alkyl-substituted 1,3-pentane provides tin-modified SBRs with lowered tan delta properties. Such modified elastomers are useful in making tread portions of pneumatic tires.

10 Claims, No Drawings

1,3,2-DIOXASTANNOLANE-MODIFIED ELASTOMERS AND COMPOSITIONS CONTAINING THEM HAVING REDUCED HYSTERESIS PROPERTIES

TECHNICAL FIELD

The subject invention relates to elastomers, vulcanizable compositions made from them and manufactured components made from these compositions. More specifically, the present invention relates to elastomers modified by reaction with cyclic tin-and oxygen-containing compounds, such as 1,3,2-dioxastannolanes, compounded compositions containing such modified elastomers and reinforcing agents and components such as treads for tires made from such compositions.

Vulcanizates made from the 1,3,2-stannolane-modified elastomers of the present invention have low hysteresis characteristics. Because of these reduced hysteresis properties, articles such as tires, power belts, vibration isolators and the like fabricated from components containing these vulcanizates exhibit increased rebound, decreased rolling resistance and lowered heat build-up when subjected to mechanical stresses.

BACKGROUND

It is known that it is desirable to produce elastomeric polymers capable of exhibiting reduced hysteresis when properly compounded with other ingredients such as reinforcing agents and then vulcanized. Such elastomers, when fabricated into components for constructing articles such as tires, vibration isolators, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such tires and prolonged tire life. In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomer properties, such as a rubber), a reinforcing filler agent (such as finely divided carbon black, thermal black, or mineral fillers such as clay and the like) and a vulcanizing system such as sulfur-containing vulcanizing (that is, curing) system.

Various synthetic strategies have been developed to provide elastomers with molecular structures exhibiting reduced hysteresis energy losses. One technique is to produce elastomers of very high molecular weight. In such high molecular weight systems, the number of free, uncrosslinked molecular chain-ends per given weight in the vulcanizates made from them are reduced. Since the presence of free, unbound chain ends are believed to be a significant factor in hysteretic energy loss because they cannot participate in elastic recovery processes, their reduction leads to a desirable reduction in hysteretic energy loss.

Another technique is to prepare elastomer molecules with end groups capable of interacting with the reinforcing fillers such as carbon black present in compounded elastomer compositions. Again, such interaction reduces the number of free end groups believed to contribute to hysteretic losses. Such interactive end groups include those derived from various metal reagents as well as those derived from polar organic reagents such amines, amides, esters, imines, imides, ketones and various combinations of such groups. For example, commonly assigned U.S. Pat. Application Ser. No. 636,961 filed Jan. 2, 1991, describes elastomers with tin containing end-groups derived by initiating polymerization under anionic conditions with tin-lithium compound such as trialkyl tin (IV) lithium that is, (alkyl)$_3$SnLi groups. This application does not disclose or suggest reaction of polymer with a 1,3,2-dioxastannolane which, under the anionic conditions used in this invention, occurs by opening of the tin-oxygen ring to form a carbon-tin bond. Thus the reactions occuring in the present invention are inherently different than those described in the above-noted reference.

Another approach to elastomers with reduced hysteresis properties of elastomer compounds involves coupling of lithium-terminated elastomer intermediates with tin halides. In such coupling reactions two or more elastomer molecules are joined or coupled through a common tin atom. U.S. Pat. Nos. 4,383,085 and 4,515,922 describe coupling of lithium-terminated polymers with tin or silicone halides. An article in *Rubber Chemistry and Technology* 63, pp8–22, by F. Tsutsumi et al (1989) describes coupling of solution prepared styrene/butadiene rubbers with tin compounds tri- and tetrachlorotin compounds.

The present invention is directed to 1,3,2-dioxastannolane-modified elastomers which, when compounded and vulcanized by known rubber processing techniques, provide vulcanized elastomers which exhibit desirable low hysteresis characteristics. These dioxastannolane-modified elastomers can be made by reacting lithium - terminated elastomer intermediates with more than about 0.4 equivalents of at least one 1,3,2-dioxastannolane. The stannolane elastomers thereby produced contain oxygen-tin-carbon moieties which either cap or couple the intermediate elastomer molecules. Mixtures of 1,3,2-dioxa stannolane modified elastomers with unmodified elastomers derived from the lithium-terminated elastomer are also useful.

DISCLOSURE OF THE INVENTION

It is therefore, an object of the present invention to provide 1,3,2-dioxastannolane-modified elastomers.

It is a further object of the present invention to provide compounded, vulcanizable elastomer compositions made from such stannolane-modified elastomers.

It is another object of the present invention to provide vulcanized elastomeric compositions having reduced hysteresis characteristics.

It is still a further object of the present invention to provide elastomeric compounds for use in manufacturing articles and components for articles which exhibit low hysteresis properties.

Still another object of the present invention is to provide improved tires having decreased rolling resistance and low heat build-up characteristics.

These and other objects together with the advantages thereof over the existing art, which shall become apparent from the specification which follows, are accomplished by the invention as hereinafter described and claimed.

SUMMARY OF THE INVENTION

The present invention provides 1,3,2-dioxastannolane-modified elastomers made by capping lithium-terminated elastomer intermediates with one or more 1,3,2-dioxastannolanes of the formula

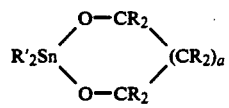

wherein each R is hydrogen or lower alkyl group of one to about eight carbons or an aryl group of six to about ten carbons and each R is a hydrocarbyl group of one to about twelve carbons and a is 0 or 1. Typically, the lithium-terminated intermediate is a diene polymer made by polymerizing a conjugated diene monomer of four to about eight carbons with a lithium initiator; often it is made by copolymerizing the diene monomer with a vinyl arene monomer of eight to about twelve carbons to produce a diene-vinyl arene copolymer of the general formula poly (butadiene-co-vinyl arene). Such copolymers are usually random in structure. Specific diene monomers include butadiene and its homologs and specific vinyl arenes include styrene and its homologs.

Also within the scope of the invention are compounded, vulcanizable elastomer compositions comprising (a) the 1,3,2-dioxastannolane-modified elastomer described above, (b) a finely divided reinforcing agent such as carbon black and (c) a vulcanizing system such as a sulfur-based vulcanizing system.

A further aspect of the invention provides a vulcanized elastomer compound of low hysteresis properties made by vulcanizing the above described elastomer compositions. The invention also includes components for fabricated rubber articles such as pneumatic tires made from these vulcanized compounds and specifically road-contacting tread components for use in the construction of such tires. Tires of low rolling resistance comprising these road-contacting tread components are also within the scope of the invention.

The invention also comprises processes for making 1,3,2-dioxastannolane-modified elastomers which comprise the steps of:

(I) polymerizing under anionic conditions with a lithium-containing initiator at least one conjugated diene monomer and, optionally at least one vinyl arene monomer, to form a lithium-terminated elastomer intermediate of lithium-terminated elastomer intermediate;

(II) reacting the lithium terminated elastomer intermediate under anionic reaction conditions with a 1,3,2-dioxastannolane of the above general formula, the amount of dioxastannolane being greater than about 0.4 molar equivalent based on lithium in the lithium-terminated elastomer intermediate, to form a lithium-terminated dioxastannolane-modified elastomer intermediate;

(III) hydrolyzing the lithium-terminated (1,3,2-dioxastannolane) elastomer intermediate, to form a 1,3,2-dioxastannolane-modified elastomer; and (IV) recovering the 1,3,2-dioxastannolane-modified elastomer.

Other aspects of the invention will be apparent to these of skill in the art upon study of this specification.

DETAILED DESCRIPTION OF THE INVENTION

The 1,3,2-dioxastannolane-modified elastomers of the present invention are made by reaction of a lithium-terminated elastomer intermediate with greater than about 0.4 molar equivalent (based on the lithium) of a 5- or 6-membered ring 1,3,2-dioxastannolane of the formula

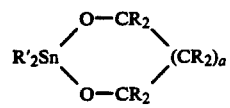

wherein R is independently a hydrogen atom, a low alkyl group of one to about eight carbons, such as a methyl, ethyl, propyl, butyl and, so forth to octyl group or an aryl group of six to ten carbons such as phenyl, tolyl, xyxyl, naphthyl and the like. Preferably, R is a hydrogen atom or a methyl, ethyl or group. In the above stannolane formula, R' is a hydrocarbyl group (that is, a group consisting of hydrogen and carbon atoms) of one to about 12 carbons such as an alkyl or alkenyl group, for example, methyl, ethyl, butyl, decyl, dodecyl, or an aryl, alkaryl or aralkyl group such as, phenyl, tolyl, xylyl, and naphthyl groups, benzyl, 2-phenyl ethyl, 2-(beta-naphthyl) ethyl and like groups. Preferably, R' is an ethyl, propyl, phenyl or benzyl group. The subscript "a" is either zero or one, making the dioxastannolane ring five- or six-membered, respectively. A particularly useful class of dioxastannolanes are those which are hydrocarbon soluble, that is, those having a solubility at 24° of at least about 10 grams, per 100 ml. of n-octane. Mixtures of two or more of the above-described 1,3,2-dioxastannolanes can also be used.

The 1,3,2-dioxastannolanes used in making the modified elastomers of the present invention are known in the art; see for example G. Reginato et al. *J. Organ. Chem.*, 1990, 55, 5132–5139 as well as W. P. Neumann, *The Organic Chemistry of Tin*, 1988 as well as the references cited therein. A convenient means of preparing 1,3,2-dioxastannolanes is by reaction of a di(hydrocarbyl) tin (IV) oxide with a 1,3- or 1,2 glycol, that is:

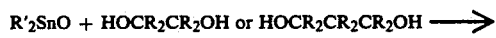

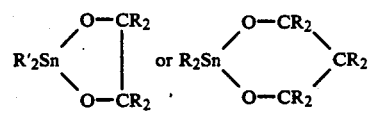

wherein R' and R are each independently as identified herein above. A convenient tin oxide material is di(butyl) tin oxide, CAS Registry No. 818-08-06. Particularly useful are dioxastannolanes with six-membered tin-oxygen-carbon rings and having, in addition, one or alkyl or aryl groups to confer hydrocarbon solubility, that is, 1,3,2-dioxastannolanes of the formula

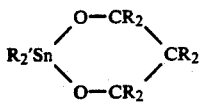

wherein at least one of R is an alkyl or aryl group as described above and R' is butyl.

The lithium-terminated elastomer intermediates of the present invention are prepared by anionic polymerization of diene monomers with a lithium-containing polymerization initiator. Useful diene monomers are conjugated alkadienes of four to about eight carbon atoms such as butadiene, isoprene, pentadiene, 2,3-dimethyl butadiene, etc. Among these, 1,3-butadiene is preferred. Mixtures of such diene monomers can be used.

While the diene monomer can be homopolymerized to provide a poly (butadiene) lithium terminated elastomer intermediate for use in this invention, it is usually preferable that it be copolymerized with a vinyl arene monomer of eight to about twelve carbons such as styrene, vinyl toluene, p-methyl styrene, alpha-methyl styrene, vinyl naphthalene and the like. Mixtures of dienes and/or vinyl arenes can also be used to make the lithium terminated elastomer intermediates used in this invention. Preferably styrene is the comonomer of choice and lithium-terminated butadiene - styrene elastomer intermediates are the result.

The above-described diene and optional vinyl arene monomers are polymerized under anionic conditions with a lithium containing polymerization initiator to provide the lithium-terminated elastomer intermediates of this invention. Techniques, parameters, conditions and initiators for such anionic polymerizations are known to these skilled in the art. Such polymerizations provide "living" polymers, that is, polymers with a reactive lithium site on the polymer molecules. Preferred monolithium initiators include alkyl and aryl lithiums such as n-butyl lithium, t-butyl and s-butyl lithium, and phenyl lithium, as well as tri(alkyl) tin lithiums such as tributyl tin lithium. When the latter type of initiator is employed, the resulting elastomer intermediate molecules carry a tri(alkyl) tin group as well as the lithium site.

Polymerization is usually conducted in a conventional solvent for anionic polymerizations such essentially moisture-free hydrocarbons such as hexane, cyclohexane, benzene and the like. Techniques for polymerization, such as semi-batch and continuous polymerization may be employed. If it is desired, to promote randomization in copolymerization and to control vinyl content, a polar coordinator may be included with the polymerization ingredients. The amount of coordinator depends on the amount of vinyl content desired, the level of styrene employed and the temperature of the polymerization, as well as the nature of the specific polar coordinator (modifier) employed.

Compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA), N-N'-dimethylpiperazine, and tributylamine; tetrahydrofuran (THF), linear and cyclic oligomeric oxolanyl alkanes such as 2-2'-di(tetrahydrofuryl) propane, di-piperidyl ethane, hexamethylphosphoramide, diazabicyclooctane, dimethyl ether, diethyl ether, and the like.

A batch polymerization is begun by charging a blend of monomer(s) and solvent to a suitable reaction vessel, followed by the addition of the polar coordinator (if employed) and the initiator compound previously described. The reactants are heated to a temperature of from about 0° to about 200° and the polymerization is allowed to proceed for from about 0.1 to about 24 hours.

It is usually desired to produce a reactive copolymer intermediate of butadiene and styrene having elastomeric properties for use in the present invention. Such polymers are well-known to the art as styrene/butadiene rubbers, that is, SBR. With such SBRs the lithium-terminated elastomer intermediate used in the present invention can be represented as poly (butadiene-co-styrene)-Li. Such SBRs usually have a diene to styrene content of 90–50 : 10–50, typically 80–60 : 20–40 and number average molecular weights, $M_n$, (as determined by gel permeation choromatography) of about 10,000 to 1,000,000 or greater, preferably about 50,000 to 750,000, typically about 125,000 to 500,000.

The modification of the lithium-terminated elastomer intermediates with the 1,3,2-dioxastannolane takes place by reaction under anionic conditions essentially the same as used in the polymerization of the diene. Often the dioxastannolane is simply added to the initial polymerization reaction mixture and reaction continued until the desired amount of dioxastannolane is reacted. Usually this reaction is conducted at a temperature between about 0°–90°, typically 15°–30° for about 0.5 to 6.0 hours or more. Often the modification reaction is carried out at ambient temperature 15°–30° for a convenient period of time such as about 1.0–4.0 hours.

The dioxastannolane-modified elastomer is recovered by standard techniques such as hydrolyzing any reactive lithium and then isolating the polymer from solvent and reaction by-products by conventional means such as precipitation, steam coagulation, thermal desolventation and the like. The capped elastomer can be further dried by drum, extruder, or vacuum drying or a combination of such procedures.

The 1,3,2-dioxastannolane-elastomers of this invention produced when about 1 equivalent of dioxastannolane reacts per lithium in the intermediate elastomer can be schematically represented by the formula:

Poly (diene-co-vinyl arene)-Sn(R')$_2$- OCR$_2$ (CR$_2$)$_a$ CR$_2$ OM wherein R and R' are as described above, co signifies the random, copolymer nature of the diene/vinyl arene portion of the polymer and a is zero or one. Such elastomers can be referred to as dioxastannolane-capped elastomers. Where less than one equivalent of 1,3,2-dioxastannolane reacts with the lithium-terminated intermediate elastomer, coupling of two elastomer intermediate molecules often occurs. It is believed this coupling proceeds through elimination of the glycol-derived moiety and the formation of a second tin-carbon bond linking two polymer molecules. The resultant coupled elastomer can be represented by the formula:

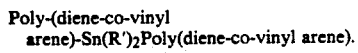

Poly-(diene-co-vinyl arene)-Sn(R')$_2$Poly(diene-co-vinyl arene).

Mixtures of varying amounts of capped and coupled elastomer molecules can also be produced when less than 1.0 equivalent, san 0.4–0.9 equivalent, of dioxastannolane is used. These mixtures are within the scope of the invention.

It is believed that the dioxastannolane-modified elastomers of the present invention interact significantly during vulcanization with filler present in the compounded elastomer rather than during mixing such as prior art polymers prepared with conventional end-capping agents. As noted above, since free, unbound polymer end groups cause high hysteresis properties, the present invention provides vulcanizates which exhibiting reduced hysteresis properties.

The dioxastannolane-modified elastomers of the present invention can be used alone or in combination with other elastomers to prepare vulcanizable compounds to make components for manufactured articles such as tires. For example, they can be blended with any conventionally employed rubber stocks such as natural rubber, synthetic rubber and blends thereof. Such synthetic rubbers are well known to those skilled in the art and include synthetic cis polyisoprene rubber, styrene-/butadiene rubber (SBR), polybutadiene, butyl rubber, Neoprene, ethylene/propylene rubber (EPR), ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the dioxastannolane-modified elastomers of the present invention are blended with conventional rubbers, the amounts can vary widely such as between 10 and 99 percent by weight, depending upon the amount of hysteresis reduction desired.

The inventive 1,3,2-dioxastannolane-modified elastomers are usually compounded with reinforcing agents such as carbon black and vulcanizing agents to provide vulcanizable, compounded elastomers. Reinforcing agents are used in amounts ranging from about 20 to about 150 parts by weight, per 100 parts by weight of rubber (phr), with about 40 to about 70 phr being preferred. The preferred carbon black reinforcing agents include any of the commonly available, commercially-produced carbon blacks but those having a surface area (EMSA) of at least 20 $m^2$/gram and more, preferably at least 35 $m^2$/gram up to 200 $m^2$/gram or higher, are specifically preferred. The surface area values referred to are those determined by ASTM-D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. See, for example, *The Vanderbilt Rubber Handbook*, pp 408–424, RT Vanderbilt Co., Norwalk, CT 06855 (1979). Other carbon blacks which may be utilized include thermal and acetylene blacks. Mixtures of two or more of the above blacks can be used in preparing the compounded elastomers of the invention. Typical values for surface areas of usable carbon blacks are summarized in the following Table I.

TABLE I

| Carbon Blacks | |
|---|---|
| ASTM Designation | Surface Area ($m^2$/g) |
| (D-1765-82a) | (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of compounded elastomers of the invention may be in pelletized form or an unpelletized flocculent mass. Preferably, for more uniform mixing, unpelletized carbon black is preferred. The reinforced rubber compounds can be cured in a conventional manner with known vulcanizing agents in the amounts of from about 0.5 to about 4 phr. For example, sulfur or peroxide-based vulcanized (curing) systems may be employed. Typically sulfur-containing vulcanizing systems for a general disclosure of suitable vulcanizing systems one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination. Other reinforcing agents and fillers can also be used such as finely divided silica, clays, talc and the like as can be other conventional rubber compounding ingredients such as anti-degradants, plasticizers, processing oils and aids, stabilizers, and the like.

The compounded, vulcanizable elastomer compositions of the invention can be prepared by compounding or mixing the dioxastannolane modified-elastomers thereof with the aforedescribed carbon black and other conventional rubber additives and vulcanizing systems using standard rubber mixing equipment and procedures and in conventional amounts for such ingredients. Such compounded elastomer compositions, when vulcanized using conventional rubber vulcanization conditions, have reduced hysteresis properties and are particularly adapted for use as tread rubbers for tires having reduced rolling resistance. A typical formulation for the compounded elastomers of the present invention is described in Table II.

TABLE II

| | Compound Formulation (phr)* |
|---|---|
| Inventive elastomer (rubber) | 100 |
| Carbon Black N339 | 50 |
| Zinc Oxide | 3 |
| Antioxidant | 1 |
| Sulfur | 1.8 |
| Stearic Acid | 2 |
| N-t-butyl-2-benzothiazyl sulfenamide | 1 |

*parts per hundred rubber

GENERAL EXPERIMENTAL

In order to demonstrate the preparation and properties of the 1,3,2-dioxastannolane-modified elastomers of the present invention, a lithium-terminated styrene/butadiene rubber (SBR) intermediate is prepared employing a suitable polymerization lithium initiator and an appropriate amount of 1,3,2-dioxastannolane, as will be more fully discussed hereinbelow. A control sample of the prepared polymer is isolated, and the remaining polymer is then modified by reaction with a 1,3,2-dioxastannolane according to the invention. As noted above, various techniques known in the art for carrying out anionic lithium-initiated polymerization, elastomer intermediates, 1,3,2-dioxastannolanes and reactant pro- millimoles is used in place of the butyl lithium. The products are inventive modified elastomer Example 2.

The 1,3,2-dioxastannolane-modified elastomers and control elastomers of of Examples 1 and 2 are analyzed by conventional techniques to determine percent styrene and vinyl content, number average molecular weight (gpc) and hysteresis properties (tan delta). The results of these determinations are shown in Table III.

TABLE III

|  | Control - 1* | Example - 1 | Control - 2* | Example - 2 |
|---|---|---|---|---|
| Init. mmoles | BuLi (13.0) | | BU$_3$SnLi (10.9) | |
| Mn × 10$^{-5}$ | 0.67 | 1.17 | 1.15 | 1.83 |
| Mw/Mn | 1.09 | 1.20 | 1.16 | 1.47 |
| % Sty. | | 28.7 | | 28.2 |
| % vinyl | | 59.1 | | 53.8 |
| Tensile, psi** | 2311 | 2653 | 2980 | 2691 |
| % E | 390 | 319 | 308 | 291 |
| Rebound % at 70° | 58.2 | 65.8 | 61.8 | 67.4 |
| Tan delta: | | | | |
| at 24° | .1779 | .1322 | | |
| at 65° | .1204 | .1050 | | |
| % change in Tan delta: | | | | |
| at 24° | | −25.7 | | |
| 65° | | −12.8 | | |
| Bu$_2$ Sn(O$_2$ C$_6$H$_{12}$), mmoles | | 6.5 | | 5.27 |

*Elastomer Intermediate withdrawn before dioxastannolane-modification, hydrolyzed and recovered.
**Elastomers compounded with 50 phr N 339 carbon black and vulcanized with sulfur at 150° for 40 minutes.

portions can be employed without departing from the scope of the present invention. In this description, as elsewhere in this application, all temperatures are in degrees centrigrade and parts and percents by weight unless expressly stated otherwise.

Both the control and the invention elastomer samples of each example are then tested, for example, for tensile strength (psi), percent elongation, tan delta (at both 24° and 65°) and the change in tan delta of the invention elastomer as compared to the control elastomer or a similar inventive elastomer is calculated. Tan delta values are determined on a Rheometrics stress rheometer at 0.5 Hz. Each compounded vulcanized elastomer can also be tested for rebound by employing the industry standard ball drop test.

EXAMPLE 1

To a 2-gallon reactor is added 2.02 lbs. of a 33% styrene solution in dry hexane and 7.00 lbs. of a 24.5% butadiene solution in dry hexane and 1.7 mmoles of a polar co-ordinator. After cooling to 13°, 13.0 millimoles of butyl lithium initiator and 12.3 moles of dry tetrahydrofuran are added. After 1.5 hours, the reaction temperature is carefully increased to 21.5°. The temperature is then increased at a rate of approximately 5°/0.25 hours until a final reaction temperature of 50° is reached. After 0.25 hours at this temperature, a sample of SBR elastomer intermediate is withdrawn, hydrolyzed and recovered to provide a Control −1 elastomer. The remaining polymerization mixture is then treated with 0.148 molar solution (in an amount to provide the number of moles shown in Table III) of dibutyl-1,3,2-dioxa-5, 6-di-(methyl)-stannolane (made from 2-methyl-1,3-pentanediol) in hexane and allowed to react at 50° for 0.25 hour. The dioxa stannolane-modified elastomer is then isolated and drum dried to give inventive modified elastomer Example 1.

EXAMPLE 2

The procedure of Example 1 is followed except an amount of tributyl tin lithium corresponding to 10.9

The tan delta values at both 24° and 65° of Examples 1-2 are reduced compared to the unmodified control elastomers (withdrawn before introduction of dioxastannolane reactant), clearly demonstrating the effects of the 1,3,2-dioxastannolane modification. The rebound values for both Examples 1 and 2 are increased showing a reduction in hysteresis compared to controls 1- and -2, respectively.

It is clear from the foregoing examples and specification disclosure that the 1,3,2-dioxastannolane-modified elastomers present invention are useful for providing vulcanized elastomer compounds with improved, that is reduced, hysteresis characteristics. These elastomers exhibit improved hysteresis properties when compared to similar elastomers prepared by similar means but lacking the dioxastannolane-derived groups. As a result, the vulcanized compounds containing these elastomers exhibit improved hysteresis properties which provide road-contacting components of improved rolling resistance for tires.

Techniques for preparing tread components for use in pneumatic tires of conventional construction (with grooved road-contacting tread components, sidewalls, spaced beads and metal-or fiber-reinforced carcasses) are known in the art. These include extrusion of the road-contacting tread components from rubber stocks including the compounded elastomers of the present invention (or in combination with other types of rubbers as noted above), assembly of the tread components with other elements of tire to provide a green tire and vulcanization of the green tire in a conventional tire mold. Tires made with road-contacting treads comprised of the vulcanized, compounded modified-elastomers according to this invention exhibit desirable properties such as reduced rolling resistance. The compounded dioxastannolane modified elastomers of this invention can also be used in other tire components such as plycoats for the fabric reinforcement of the tire carcass, in the sidewalls or in the tread rubber base (located under the road-contacting tread portion or tread cap) as well as in other industrial rubber goods such as air springs seismic anti-vibration isolators, engine mounts and the like where the low hysteresis properties they manifest upon vulcanization will provide properties of advantage.

It is to be understood that the invention is not limited to the specific initiators, elastomer intermediates, 1,3,2-dioxastannolanes, monomers, polar coordinators, reactant ratios, solvents or techniques disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove that are within the invention.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A compounded, vulcanizable elastomer composition comprising:
    (a) a dioxastannolane - modified elastomer made by reacting under anionic conditions a lithium-terminated elastomer intermediate with a 1,3,2-dioxastannolane of the formula

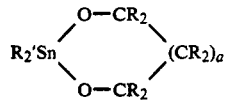

wherein each R is a hydrogen or lower alkyl group of one to about eight carbons or an aryl group of six to about ten carbons and each R' is a hydrocarbyl group of one to about twelve carbons and a is 0 or 1, and wherein the elastomer intermediate is a diene elastomer made by polymerizing a conjugated diene monomer of four to about eight carbons with a lithium initiator selected from the group consisting of alkyl lithiums of one to about eight carbons, aryl lithiums of six to about twelve carbons, tri(alkyl) tin lithiums wherein each alkyl is of one to about eight carbons and combinations of two or more of these;
    (b) a finely divided reinforcing agent; and
    (c) a vulcanizing system.

2. The elastomer composition of claim 1 wherein the diene elastomer intermediate is a diene-vinyl arene polymer made by copolymerizing the diene monomer with a vinyl arene monomer of eight to about twelve carbons.

3. The elastomer composition of claim 2 wherein the elastomer intermediate is a random styrene-butadiene rubber.

4. The elastomer composition of claim 3 wherein R' is lower alkyl group of one to about eight carbons and each R is independently hydrogen or a methyl, ethyl or phenyl group and a is one.

5. The elastomer composition of claim 2 wherein the dioxastannolane-modified elastomer is represented by the formula:

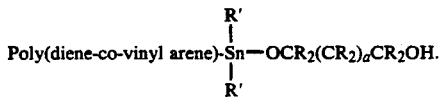

6. The elastomer composition of claim 2 wherein the dioxastannolane-modified elastomer is of the formula:

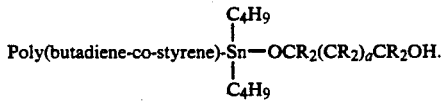

7. A compounded, vulcanizable elastomer composition comprising (a) the dioxastannolane - modified elastomer of claim 3, (b) a carbon black reinforcing gent and (c) a sulfur-based vulcanizing system.

8. The elastomer composition of claim 6 (a) 100 parts by weight of the dioxastannolane - modified elastomer, (b) about 20-150 parts by weight of carbon black reinforcing agent (c) an effective amount of a sulfur-based vulcanizing system.

9. A vulcanized elastomer compound of low hysteresis properties made by vulcanizing the composition of claim 1.

10. A vulcanized elastomer compound of low hysteresis properties made by vulcanizing the composition of claim 8.

* * * * *